United States Patent
Matsumoto et al.

(10) Patent No.: US 12,281,230 B2
(45) Date of Patent: *Apr. 22, 2025

(54) INKJET INKS

(71) Applicant: Kao Corporation, Tokyo (JP)

(72) Inventors: Yuta Matsumoto, Cincinnati, OH (US); Daniel Sandker, Cincinnati, OH (US)

(73) Assignee: Kao Corporation, Tokyo (JP)

( * ) Notice: Subject to any disclaimer, the term of this patent is extended or adjusted under 35 U.S.C. 154(b) by 955 days.

This patent is subject to a terminal disclaimer.

(21) Appl. No.: 17/297,703

(22) PCT Filed: Nov. 30, 2018

(86) PCT No.: PCT/US2018/063222
§ 371 (c)(1),
(2) Date: May 27, 2021

(87) PCT Pub. No.: WO2020/112127
PCT Pub. Date: Jun. 4, 2020

(65) Prior Publication Data
US 2022/0041873 A1    Feb. 10, 2022

(51) Int. Cl.
| | | |
|---|---|---|
| *C09D 11/033* | (2014.01) | |
| *B41J 2/01* | (2006.01) | |
| *C08G 77/442* | (2006.01) | |
| *C08K 5/05* | (2006.01) | |
| *C08K 5/17* | (2006.01) | |
| *C09D 11/037* | (2014.01) | |
| *C09D 11/104* | (2014.01) | |
| *C09D 11/107* | (2014.01) | |
| *C09D 11/38* | (2014.01) | |

(52) U.S. Cl.
CPC ............... *C09D 11/033* (2013.01); *B41J 2/01* (2013.01); *C08G 77/442* (2013.01); *C08K 5/05* (2013.01); *C08K 5/17* (2013.01); *C09D 11/037* (2013.01); *C09D 11/104* (2013.01); *C09D 11/107* (2013.01); *C09D 11/38* (2013.01); *C08K 2201/019* (2013.01)

(58) Field of Classification Search
CPC ... C09D 11/033; C09D 11/037; C09D 11/104; C09D 11/107; C09D 11/38; C09D 11/106; C09D 11/36; C09D 11/30; B41J 2/01; C08G 77/442; C08K 5/05; C08K 5/17; C08K 2201/019; B41M 5/0023; B41M 7/00
See application file for complete search history.

(56) References Cited

U.S. PATENT DOCUMENTS

| | | | |
|---|---|---|---|
| 2006/0152569 A1 | 7/2006 | Jinnou et al. | |
| 2014/0186529 A1 | 7/2014 | Sexton et al. | |
| 2015/0291816 A1 | 10/2015 | Cross et al. | |
| 2016/0272827 A1 | 9/2016 | Goustiaux et al. | |
| 2017/0037269 A1* | 2/2017 | Isobe ......................... | B41J 2/01 |
| 2018/0072902 A1* | 3/2018 | Takemoto ............ | C09D 11/103 |
| 2018/0215965 A1* | 8/2018 | Fukuhara ............ | H01L 21/6835 |
| 2018/0251650 A1 | 9/2018 | Xue et al. | |

FOREIGN PATENT DOCUMENTS

| | | | |
|---|---|---|---|
| CN | 1697881 A | 11/2005 | |
| EP | 3 263 660 A1 | 1/2018 | |
| JP | 11-12518 A | 1/1999 | |
| JP | 2000-178487 A | 6/2000 | |
| JP | 2006-36951 A | 2/2006 | |
| JP | 2007070544 A * | 3/2007 | |
| JP | 4727418 B2 * | 7/2011 | ............... C09C 3/10 |
| JP | 2016-138201 A | 8/2016 | |
| JP | 2017-8199 A | 1/2017 | |
| JP | 2017-61637 A | 3/2017 | |
| JP | 2017061637 A * | 3/2017 | |
| JP | WO2016/136675 A1 | 12/2017 | |
| JP | 2018-65982 A | 4/2018 | |

OTHER PUBLICATIONS

"Terpene Phenolic Resin." YasuharaChemical, www.yschem.co.jp/english/products/resin/terpene_phenol.html. Accessed Jun. 29, 2024. (Year: 2024).*
"25359-84-6." ChemicalBook, www.chemicalbook.com/ChemicalProductProperty_US_CB51214559.aspx. Accessed Jun. 29, 2024. (Year: 2024).*
English machine translation of JP-2007070544-A (Year: 2007).*
English machine translation of JP-4727418-B2 (Year: 2011).*
English machine translation of JP-2017061637-A (Year: 2017).*
International Search Report and Written Opinion issued on Feb. 6, 2019 in PCT/US2018/063222 filed on Nov. 30, 2018.
Extended European Search Report issued Jun. 2, 2022, in corresponding European Patent Application No. 18941639.9, 6 pages.

* cited by examiner

*Primary Examiner* — Jennifer A Smith
*Assistant Examiner* — Jeffrey Eugene Barzach
(74) *Attorney, Agent, or Firm* — Oblon, McClelland, Maier & Neustadt, L.L.P.

(57) ABSTRACT

An inkjet ink that includes (A) a terpene phenol resin having a hydroxyl value of 46 to 150 mgKOH/g, (B) ethanol, and (C) 1-propanol. A printed article including the inkjet ink in dried form, and a method of forming a printed image with a thermal inkjet printhead are also provided.

19 Claims, No Drawings

INKJET INKS

BACKGROUND OF THE INVENTION

Field of the Invention

The present invention relates to inkjet inks, specifically inkjet inks that include (A) a terpene phenol resin having a hydroxyl value of 46 to 150 mgKOH/g, (B) ethanol, and (C) 1-propanol.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Thermal inkjet (TIJ) printing is a desirable technology for printing, coding, and marking as it offers high print resolutions at lower costs than competing technologies in the field, such as continuous inkjet methods. In thermal inkjet printing processes, the print cartridges contain a series of tiny chambers, each containing a heater, which produce ink droplets from thermal vaporization of an ink solvent. In the jetting process, a resistor is heated rapidly to produce a vapor bubble (hence the phrase "bubble jet"), which subsequently ejects a droplet from the orifice. This process is extremely efficient and reproducible and modern TIJ printheads for industrial graphics applications are capable of generating uniform drops of 4 µL or smaller in volume at frequencies of 36 kHz or greater.

However, thermal inkjet inks can suffer from poor decap behavior (e.g., short decap time, printhead clogging, kogation), slow drying times after application, and inadequate substrate adhesion, and it is often difficult to strike a balance between these characteristics.

A leading strategy to combat these competing problems involves use of special solvent systems to achieve satisfactory decap behavior and drying times, and the inclusion of tackifiers to aid adhesion. For example, US 2017/0037269A1 and US 2018/0072902A1, each incorporated herein by reference in its entirety, describe inkjet ink systems using terpene phenol resins as tackifiers. In these systems, terpene phenol resins having hydroxyl values ranging from 10 to 45 mgKOH/g were found to provide satisfactory adhesion, while still maintaining acceptable decap and drying times. Interestingly, terpene phenol resins with hydroxyl values of greater than 45 mgKOH/g were found to provide inadequate substrate adhesion, as well as defective decap times.

While inkjet inks containing terpene phenol resin tackifiers are known, none have been disclosed which produce high optical density prints. Optical density, which is a measure of the coverage characteristics of an ink, is one of the most important indicators of how well ink forms a crisply defined dot (or other image) with a given drop volume. The higher the optical density number, the more light absorbs into the print surface and the darker the shade. Thus, it is desirable to provide the highest optical density for the lowest colorant concentration so that the inkjet ink handles well in the ink cartridge and produces a high quality image.

SUMMARY OF THE INVENTION

In view of the forgoing, there is a need for inkjet inks that solve the problems outlined above while also affording high optical density prints.

Accordingly, it is one object of the present invention to provide novel inkjet inks that meet these criteria.

It is another object of the present disclosure to provide novel printed articles which contain a dried form of the inkjet inks.

It is another object of the present disclosure to provide novel methods of forming a printed image on a substrate by applying the inkjet inks onto the substrate and drying.

These and other objects, which will become apparent during the following detailed description, have been achieved by the inventors' discovery that the combination of a terpene phenol resin having a hydroxyl value of 46 to 150 mgKOH/g, ethanol, and 1-propanol unexpectedly affords a combination of quick dry times, and excellent optical density.

Thus, the present invention provides:

(1) An inkjet ink, comprising:
  (A) a terpene phenol resin having a hydroxyl value of 46 to 150 mgKOH/g;
  (B) ethanol; and
  (C) 1-propanol.

(2) The inkjet ink of (1), wherein the terpene phenol resin (A) is a copolymer formed from a reaction between a monoterpene and a phenolic compound comprising at least one hydroxyl group and at least two replaceable hydrogen atoms in ortho- and/or para-positions with respect to the at least one hydroxyl group.

(3) The inkjet ink of (2), wherein the monoterpene is at least one bicyclic monoterpene selected from the group consisting of 3-carene, α-pinene, β-pinene, and camphene.

(4) The inkjet ink of (2) or (3), wherein the phenolic compound is phenol.

(5) The inkjet ink of any one of (1) to (4), wherein the terpene phenol resin (A) has a hydroxyl value of 65 to 135 mgKOH/g.

(6) The inkjet ink of any one of (1) to (5), wherein the terpene phenol resin (A) is present in an amount of 0.1 to 10 wt. %, based on a total weight of the inkjet ink.

(7) The inkjet ink of any one of (1) to (6), wherein a weight ratio of 1-propanol (C) to ethanol (B) ((C):(B)) is 0.1:1 to 3.5:1.

(8) The inkjet ink of any one of (1) to (7), wherein a combined weight of ethanol (B) and 1-propanol (C) ((B)+(C)) in the inkjet ink is 50 to 95 wt. %, based on a total weight of the inkjet ink.

(9) The inkjet ink of any one of (1) to (8), further comprising (D) an alkanolamine.

(10) The inkjet ink of (9), wherein the alkanolamine (D) comprises 2 to 8 carbon atoms.

(11) The inkjet ink of (9) or (10), wherein the alkanolamine (D) is isopropanolamine.

(12) The inkjet ink of any one of (9) to (11), wherein the alkanolamine (D) is present in an amount of up to 3 wt. %, based on a total weight of the inkjet ink.

(13) The inkjet ink of any one of (1) to (12), further comprising (E) a silicone acrylate copolymer.

(14) The inkjet ink of (13), wherein the silicone acrylate copolymer (E) is a graft copolymer.

(15) The inkjet ink of (13) or (14), wherein the silicone acrylate copolymer (E) is present in an amount of up to 5 wt. %, based on a total weight of the inkjet ink.

(16) The inkjet ink of any one of (1) to (15), further comprising (F) a colorant.

(17) The inkjet ink of any one of (1) to (16), which is substantially free of a ketone solvent.

(18) The inkjet ink of any one of (1) to (17), which is substantially free of 2-propanol.

(19) A printed article, comprising:
a substrate and a dried form of the inkjet ink of any one of (1) to (18) disposed on the substrate.

(20) A method of forming a printed image on a substrate, comprising:
applying the inkjet ink of any one of (1) to (18) onto the substrate with a thermal inkjet printhead; and
drying the inkjet ink.

(21) The method of (20), wherein the inkjet ink is dried by leaving exposed to air for 30 seconds or less.

(22) The method of (20) or (21), wherein a heater is not employed for drying the inkjet ink.

The foregoing paragraphs have been provided by way of general introduction, and are not intended to limit the scope of the following claims. The described embodiments, together with further advantages, will be best understood by reference to the following detailed description.

DETAILED DESCRIPTION OF THE INVENTION

In the following description, it is understood that other embodiments may be utilized and structural and operational changes may be made without departure from the scope of the present embodiments disclosed herein.

The phrase "substantially free", unless otherwise specified, describes an amount of a particular component in the inkjet ink being less than 1 wt. %, preferably less than 0.5 wt. %, more preferably less than 0.1 wt. %, even more preferably less than 0.05 wt. %, yet even more preferably 0 wt. %, relative to a total weight of the inkjet ink.

As used herein, the terms "optional" or "optionally" means that the subsequently described event(s) can or cannot occur or the subsequently described component(s) may or may not be present (e.g., 0 wt. %).

The term "alkyl", as used herein, unless otherwise specified, refers to a straight, branched, or cyclic, aliphatic fragment having 1 to 22 carbon atoms, preferably 2 to 20, preferably 3 to 18. Examples of alkyl groups include, but are not limited to, methyl, ethyl, propyl, isopropyl, butyl, isobutyl, t-butyl, pentyl, isopentyl, neopentyl, hexyl, isohexyl, 3-methylpentyl, 2,2-dimethylbutyl, 2,3-dimethylbutyl, lauryl, myristyl, cetyl, stearyl, and the like, including guerbet-type alkyl groups (e.g., 2-methylpentyl, 2-ethylhexyl, 2-proylheptyl, 2-butyloctyl, 2-pentylnonyl, 2-hexyldecyl, 2-heptylundecyl, 2-octyldodecyl, 2-nonyltridecyl, 2-decyltetradecyl, and 2-undecylpentadecyl). Cycloalkyl is a type of cyclized alkyl group. Exemplary cycloalkyl groups include, but are not limited to, cyclopropyl, cyclobutyl, cyclopentyl, cyclohexyl, norbornyl, and adamantyl.

As used herein, the term "aryl" refers to an aromatic group containing only carbon in the aromatic ring(s), such as phenyl, biphenyl, naphthyl, anthracenyl, and the like.

The term "(meth)acrylate" is used herein to refer to both acrylate and methacrylate groups. In other words, this term should be read as through "meth" is optional. Further, "(meth)acrylate" is used generally to refer to both acrylic acid-based compounds and acrylic ester-based compounds.

Inkjet Inks

The present disclosure is directed to inkjet inks that possess suitable physical and chemical stability at both ambient temperatures and printhead operating temperatures, are jetted reliably, dry quickly after being applied onto a substrate (e.g., dry times of 30 seconds or less) and produce high optical density prints. The combination of ingredients disclosed herein has been unexpectedly found to strike a balance between high adhesion/high optical density prints and fast dry times once applied to substrates without detriment to decap behavior.

Inkjet inks of the present disclosure generally include the following components: (A) a terpene phenol resin, (B) ethanol, and (C) 1-propanol, and optionally include one or more of (D) an alkanolamine, (E) a silicone acrylate copolymer, (F) a colorant, and (G) an additive.

(A) Terpene Phenol Resin

Terpene phenol resins (A) are the copolymeric reaction products from alkylation of one or more phenolic compounds with one or more terpenes, and have been used in inks and adhesives to provide a tackifier effect. As known by those of ordinary skill in the art, such resins may be readily obtained through copolymerization of phenol and terpene monomers under the catalytic action of strong acids, metal salts having a condensing effect, bleaching earths, Friedel-Craft catalysts (e.g., boron trifluoride), and the like. The copolymeric reaction products may also have other constitutional units other than constitutional units derived from phenolic compounds and constitutional units derived from terpene. The amount of other constitutional unit is preferably less than 5 mol %, preferably less than 3 mol %, preferably less than 1 mol %, preferably substantially free, based on the total constitutional units (100 mol %) of the copolymeric reaction products.

The terpene phenol resins (A) utilized herein may be based on any terpene having at least one olefinic double bond that is capable of being alkylated by a phenolic compound. Terpenes have a basic skeleton $(C_5H_8)_p$ where p is a positive integer that delineates the number of isoprene units that are successively bound head to tail. For example, hemiterpenes (p=1) have a $C_5H_8$ skeleton, monoterpenes (p=2) have a $C_{10}H_{16}$ skeleton, sesquiterpenes (p=3) have a $C_{15}H_{24}$ skeleton, and so forth.

In some embodiments, the terpene phenol resin (A) is based on monoterpene monomer units. The monoterpene may be a linear monoterpene (e.g., myrcene, ocimene, etc.), a monocyclic monoterpenes (e.g., limonene, γ-terpinene, α-phellandrene, β-phellandrene, terpinolene, etc.), or a bicyclic monoterpene (e.g., 3-carene, α-pinene, β-pinene, α-fenchene, camphene, etc.), including the various stereoisomers thereof, as well as mixtures thereof. In preferred embodiments, the monoterpene is a bicyclic monoterpene, with particular preference to 3-carene, α-pinene, β-pinene, and camphene, more preferably α-pinene and/or β-pinene.

A phenolic compound has at least one hydroxyl group directly bonded to a phenyl ring. All mono- or polyvalent phenolic compounds are useful in the preparation of the terpene phenol resin described herein provided that the phenolic compound has at least two replaceable hydrogen atoms in ortho- and/or para-positions with respect to at least one hydroxyl group. That is, the phenolic compound should be capable of being polyalkylated (e.g., bis-alkylated) with the terpene(s), and thus should have at least two available ortho-/para-positions with respect to at least one hydroxyl group for alkylation.

In preferred embodiments, the phenolic compound is phenol, which is considered the parent unsubstituted phenolic compound (i.e., contains one hydroxyl group bonded directly to the phenyl ring with no other substitution). Alternatively, the phenolic compound may be substituted at up to three positions in addition to the phenolic hydroxyl group, wherein one, two or three of the aromatic hydrogens of phenol are replaced with an equal number of substituents, each independently selected from a hydroxyl group; a $C_1$-$C_{22}$ alkyl group, preferably a $C_2$-$C_{18}$ alkyl group, more preferably a $C_3$-$C_{12}$ alkyl group, even more preferably a $C_4$-$C_9$ alkyl group, for example, methyl, ethyl, n-propyl, isopropyl, n-butyl, isobutyl, tert-butyl; a $C_1$-$C_{22}$ alkoxy group, preferably a $C_2$-$C_{12}$ alkoxy group, more preferably a $C_3$-$C_6$ alkoxy group, for example, methoxy, ethoxy, and isopropoxy; an aryl group; an arylalkyl group, for example a benzyl group; and a halo group such as chlorine, bromine, fluorine and iodine.

Specific examples of substituted phenolic compounds include, but are not limited to, o-cresol, m-cresol, p-cresol, 2,5-xylenol, 2,3-xylenol, 3,4-xylenol, 3,5-xylenol, 2,3,5-trimethylphenol, isopropylphenol (e.g., 4-isopropylphenol), tert-butylphenol (e.g., 4-tert-butylphenol), amylphenol (e.g., 4-tert-amylphenol), heptylphenol (e.g., 4-heptylphenol), octylphenol (e.g., o-octylphenol, p-octylphenol, etc.), nonylphenol (e.g., 4-(2,4-dimethylheptan-3-yl)phenol), decylphenol, dodecylphenol, diphenylolpropane (bisphenol-A), phenylphenol (e.g., 3-phenylphenol), cumylphenol, mequinol, benzyloxyphenol, guaiacol, ethoxyphenol (e.g., 4-ethoxyphenol), as well as polyhydric phenolic compounds such as resorcinol, pyrogallol, catechol, and p-hydroquinone, including mixtures of two or more of any of the above. Also included are fused ring phenols such as naphthols (e.g., 1-naphthol, 2-naphthol, etc.) and similar compounds.

In preferred embodiments, the terpene phenol resin (A) employed in the inkjet ink is a copolymer formed from α-pinene and phenol.

The terpene phenol resin (A) may be present in the inkjet inks in an amount of at least 0.1 wt. %, preferably at least 0.5 wt. %, preferably at least 1 wt. %, preferably at least 1.5 wt. %, preferably at least 2 wt. %, preferably at least 2.5 wt. %, and up to 10 wt. %, preferably up to 9 wt. %, preferably up to 8 wt. %, preferably up to 7 wt. %, preferably up to 6 wt. %, preferably up to 5 wt. %, preferably up to 4 wt. %, preferably up to 3 wt. %, based on a total weight of the inkjet ink.

The molecular weight of the terpene phenol resin (A) may vary depending on the monomers utilized, the reaction conditions, among many other factors, but typically terpene phenol resins (A) are used that have a weight average molecular weight of at least 400 g/mol, preferably at least 500 g/mol, more preferably at least 600 g/mol, even preferably at least 700 g/mol, and up to 3,000 g/mol, preferably up to 2,500 g/mol, more preferably up to 2,000 g/mol, even more preferably up to 1,500 g/mol.

The hydroxyl value (OHV) is defined as the number of milligrams of potassium hydroxide required to neutralize the acetic acid taken up on acetylation of one gram of a chemical substance that contains free hydroxyl groups. Therefore, the hydroxyl value, or the measure of the relative hydroxyl content of the terpene phenol resin (A), is directly correlated to the content of the phenolic compound(s) within the terpene phenol resin (A), with higher hydroxyl values indicating higher phenolic compound incorporation into the copolymer (and lower terpene incorporation). Hydroxyl values can be determined according to Japanese Industrial Standards JIS K 0070: 1992 "Test methods for acid value, saponification value, ester value, iodine value, hydroxyl value, and unsaponifiable matter of chemical products."

In preferred embodiments, the terpene phenol resins (A) utilized herein have a hydroxyl value of at least 46 mgKOH/g, preferably at least 48 mgKOH/g, preferably at least 50 mgKOH/g, preferably at least 52 mgKOH/g, preferably at least 54 mgKOH/g, preferably at least 56 mgKOH/g, preferably at least 58 mgKOH/g, preferably at least 60 mgKOH/g, more preferably at least 62 mgKOH/g, even more preferably at least 64 mgKOH/g, yet even more preferably at least 65 mgKOH/g, and up to 150 mgKOH/g, preferably up to 148 mgKOH/g, preferably up to 146 mgKOH/g, preferably up to 144 mgKOH/g, preferably up to 142 mgKOH/g, preferably up to 140 mgKOH/g, more preferably up to 138 mgKOH/g, even more preferably up to 136 mgKOH/g, yet even more preferably up to 135 mgKOH/g. Suitable examples of such terpene phenol resins (A) include, but are not limited to, T145 POLYSTER (OHV=65 mgKOH/g) and G125 POLYSTER (OHV=135 mgKOH/g), available from Yasuhara Chemical Co. Ltd.

It has been surprisingly found that use of terpene phenol resins (A) having such hydroxyl values indicated above, when combined with a solvent system of ethanol (B) and 1-propanol (C), provide inkjet inks with excellent adhesion and high optical density prints (i.e., optical densities at 600*300 dpi of greater than or equal to 1.90) in addition to quick dry times after application and acceptable decap times. This is unexpected since the use of terpene phenol resins having hydroxyl values exceeding 45 mgKOH/g were previously thought to provide insufficient adhesion as well as unacceptable decap times [US 2017/0037269A1; US 2018/0072902A1—each incorporated herein by reference in its entirety].

Without being bound by theory, the combination of terpene phenol resin (A) having the previously mentioned hydroxyl values (e.g., at least 46 mgKOH/g and up to 150 mgKOH/g) and the solvent system of ethanol (B) and 1-proponaol (C) (discussed hereinafter) may provide excellent optical density prints due to strong adhesion to the substrate provided by the affinity between the terpene phenol resin (A) and said solvents. In general, high affinity leads to slow dry times, however, fast dry times are achieved by the disclosed inks. This fast drying effect may be due to the alkyl chain of 1-propanol, which may interrupt the hydrogen bond network by not allowing too high a number of hydrogen bonds from forming. When terpene phenol resins (A) are used that have hydroxyl values below the prescribed ranges, such as those described in US 2017/0037269A1 and US 2018/0072902A1, for example U130 POLYSTER (OHV=25 mgKOH/g, available from Yasuhara Chemical Co. Ltd.), U115 POLYSTER (OHV=30 mgKOH/g, available from Yasuhara Chemical Co. Ltd.), and DERTOPHENE T (OHV=40 mgKOH/g, available from Pinova), poor optical density prints of less than 1.90 are instead obtained. Likewise, terpene phenol resins (A) having hydroxyl values above the prescribed ranges, for example, N125 POLYSTER (OHV=165 mgKOH/g, available from Yasuhara Chemical Co. Ltd.) and K125 POLYSTER (OHV=205 mgKOH/g, available from Yasuhara Chemical Co. Ltd.), also provide inadequate optical densities.

In addition to the terpene phenol resin (A), the inkjet inks may optionally contain other tackifier or adhesive substances in amounts described above for the terpene phenol resin. Such additional tackifier or adhesive substances may include, but are not limited to, phenol resins (i.e. copolymers of phenolic compounds with formaldehyde), for example novolak resins such as PHENOLITE TD-2131 and PHENOLITE TD-2090 available from DIC Corp.;

terpene resins (i.e. homopolymers or copolymers made solely from terpene monomers), for example YS RESIN PX1250, YS RESIN PX1150, YS RESIN PX1000, YS RESIN PX800, YS RESIN PX1150N, and YS RESIN PX300N, available from Yasuhara Chemical Co. Ltd.;

rosin ester resins, which can be an ester of a rosin composed mainly of an abietic type or pimaric type resin acid and alcohols such as glycerin, a pentaerythritol, a triethylene glycol, etc., for example HARIESTER products available from Harima Chemicals, Inc., STAYBELITE ESTER 10-E, available from Eastman, SUPER ESTER A-125, SUPER ESTER A-75, PENSEL D-125, PINECRYSTAL KE-359 available from Arakawa Chemical Industries, Ltd., and FORAL 85 and PENTALYN products available from Pinova;

polyamide resins, for example VERSAMID 725, 744, 756, 759 available from BASF Japan Ltd., TOHMIDE 90, 92, 394-N available from Sanho Chemical Co. Ltd., and SUNMIDE 550, 554, 615A, 638, 640 available from Evonik;

epoxy resins for example AD-PRO MTS available from Rit-Chem;

acrylic resins for example JONCRYL 63, JONCRYL 67, JONCRYL 682, JONCRYL 693, available from BASF;

polyurethane resins, for example PERMAX 200, PERMAX 202, and SANCURE 20025F, available from Lubrizol;

polyvinyl butyral resins, for example PIOLOFORM BN 16 and MOWITAL B20H available from Kuraray America, Inc.;

vinyl resins, for example UCAR VYHH, VMCH, YMCA, and VAGF, available from Dow Chemical Company, and VINNOL E15/45, H14/36, E15/45M, and E16/40A, available from Wacker Chemie AG, Germany;

and the like, including mixtures thereof.

In some embodiments, the inkjet inks are substantially free of phenol resins. In some embodiments, the inkjet inks are substantially free of terpene resins. In some embodiments, the inkjet inks are substantially free of rosin ester resins. In some embodiments, the inkjet inks are substantially free of polyamide resins. In more preferred embodiments, the terpene phenol resin (A) is the only tackifier or adhesive resin present in the inkjet inks.

(B) Ethanol and (C) 1-Propanol

In many printing processes that utilize solvent-based inks, and particularly in thermal inkjet printing, the selection of an appropriate solvent system may impact the reliability of the printing process, the properties/appearance of the printed ink product, and the overall printing process efficiency. For example in thermal inkjet printing, the choice of solvent system may 1) aid bubble formation during the jetting process resulting in reliable ink jetting, 2) affect the stability/volatility of the inkjet inks by changing the interaction dynamics between the solvent(s) and the various inkjet ink components and thus the decap behavior, kogation, and/or drop trajectory, 3) impact the adhesion, rub and scratch resistance, and optical density properties of the printed image through the interactive forces between the solvent system and the other inkjet ink components even though the solvent(s) may no longer be present, or may be present in lesser amounts, after drying, and/or 4) influence the drying time after application or the equipment needed to dry the applied ink.

In preferred embodiments, the inkjet inks include a combination of (B) ethanol and (C) 1-propanol as the solvent system. The particular combination of ethanol (B) and 1-propanol (C) used in the present inkjet inks strikes a balance between high affinity with the terpene phenol resin (A) (and thus improved adhesion to the substrate/optical density), and fast dry times after application.

In preferred embodiments, a weight ratio of 1-propanol (C) to ethanol (B) ((C):(B)) is at least 0.1:1, preferably at least 0.2:1, preferably at least 0.25:1, more preferably at least 0.3:1, even more preferably at least 0.5:1, yet even more preferably at least 0.7:1, and up to 3.5:1, preferably up to 3:1, more preferably up to 2.5:1, even more preferably up to 2.1:1, yet even more preferably up to 1.8:1.

In some embodiments, ethanol (B) is present in the inkjet inks in an amount of at least 25 wt. %, preferably at least 28 wt. %, preferably at least 30 wt. %, more preferably at least 35 wt. %, even more preferably at least 40 wt. %, yet even more preferably at least 45 wt. %, and up to 85 wt. %, preferably up to 80 wt. %, more preferably up to 75 wt. %, even more preferably up to 70 wt. %, yet even more preferably up to 65 wt. %, based on a total weight of the inkjet inks.

In some embodiments, 1-propanol (C) is present in the inkjet inks in an amount of at least 10 wt. %, preferably at least 15 wt. %, more preferably at least 20 wt. %, even more preferably at least 25 wt. %, yet even more preferably at least 30 wt. %, and up to 60 wt. %, preferably up to 55 wt. %, more preferably up to 50 wt. %, even more preferably up to 45 wt. %, based on a total weight of the inkjet inks.

Taken together, a combined weight of ethanol (B) and 1-propanol (C) ((B)+(C)) in the inkjet ink is typically at least 50 wt. %, preferably at least 55 wt. %, more preferably at least 60 wt. %, even more preferably at least 65 wt. %, yet even more preferably at least 70 wt. %, and up to 95 wt. %, preferably up to 90 wt. %, more preferably up to 85 wt. %, based on a total weight of the inkjet ink.

In preferred embodiments, the inkjet inks of the present disclosure are substantially non-aqueous, meaning that no water is added to the inkjet inks other than what may be incidental amounts of moisture derived from ambient conditions. In such cases, the inkjet inks may have less than 1 wt. %, preferably less than 0.5 wt. %, preferably less than 0.1 wt. %, preferably less than 0.05 wt. %, preferably less than 0.01 wt. % of water, more preferably 0 wt. %, based on the total weight of inkjet inks.

In addition to ethanol (B) and 1-propanol (C), the inkjet inks may optionally contain one or more additional organic solvents. When present, the additional organic solvents may be included in amounts of up to 20 wt. %, preferably up to 15 wt. %, preferably up to 10 wt. %, preferably up to 5 wt. %, more preferably up to 4 wt. %, even more preferably up to 2 wt. %, yet even more preferably up to 1 wt. %. Exemplary additional organic solvents include, but are not limited to:

lower alcohols containing from 1 to 8 carbon atoms, such as methanol, 1-butanol, 2-butanol, 2-propanol;

glycol ethers such as ethylene glycol monomethyl ether, ethylene glycol monoethyl ether, ethylene glycol monobutyl ether, diethylene glycol monomethyl ether, diethylene glycol monoethyl ether, diethylene glycol mono-n-propyl ether, ethylene glycol mono-isopropyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-isopropyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether, and dipropylene glycol mono-iso-propyl ether;

ethers (non-glycol ethers), for example ethers containing 4 to 8 carbon atoms such as diethyl ether, dipropyl ether, methyl tert-butyl ether, dibutyl ether, dioxane, and tetrahydrofuran;

ketones, for example ketones containing 3 to 6 carbon atoms, including acetone, methyl ethyl ketone, 3-pentanone, and cyclohexanone;

esters, including those having 3 to 8 carbon atoms, for example methyl acetate, ethyl acetate, n-butyl acetate, methyl lactate, ethyl lactate, methoxyethyl acetate, ethoxyethyl acetate, methoxypropyl acetate, ethoxypropyl acetate;

and the like, as well as mixtures of two or more thereof.

In preferred embodiments, ethanol (B) and 1-propanol (C) are the only lower alcohols having 1 to 8 carbon atoms present in the inkjet inks, that is, the inkjet inks are substantially free of all lower alcohols (having 1 to 8 carbon atoms) other than ethanol (B) and 1-propanol (C). In particular, the inkjet inks are preferably substantially free of 2-propanol and 1-butanol. In some embodiments, the inkjet inks are substantially free of ketone solvents, in particular, the inkjet inks are preferably substantially free of methyl ethyl ketone and acetone. In some embodiments, the inkjet inks are substantially free of additional organic solvents, that is, organic solvents other than ethanol (B) and 1-propanol (C).

(D) Alkanolamine

Alkanolamines are alkane-based compounds that contain both hydroxyl (—OH) and amino (primary, secondary, or tertiary) groups. Alkanolamines (D) may be optionally employed in the inkjet inks to aid formation of printed images with high gloss and optical density characteristics. When used, the alkanolamine (D) may be present in the inkjet inks in amounts of at least 0.01 wt. %, preferably at least 0.05 wt. %, preferably at least 0.1 wt. %, and up to 3 wt. %, preferably up to 2.5 wt. %, preferably up to 2 wt. %, preferably up to 1.5 wt. %, preferably up to 1 wt. %, preferably up to 0.5 wt. % relative to the total weight of the inkjet inks.

In some embodiments, the alkanolamine (D) has a total of at least 2 carbon atoms, preferably at least 3 carbon atoms, preferably at least 4 carbon atoms, and up to 8 carbon atoms, preferably up to 7 carbon atoms, more preferably up to 6 carbon atoms, more preferably up to 5 carbon atoms.

In preferable embodiments, the alkanolamine (D) used in the inkjet inks herein has the following general formula I:

wherein X, Y and Z are independently selected from the group consisting of hydrogen;

a $C_1$-$C_5$ alkyl group, preferably a $C_2$-$C_3$ alkyl group; and an alkanol group, preferably a $C_2$-$C_5$ alkanol group, more preferably a $C_3$-$C_4$ alkanol group;

wherein at least one of X, Y and Z is an alkanol group (bears at least one hydroxyl group).

In some embodiments, one of X, Y, and Z is an alkanol group. In some embodiments, two of X, Y, and Z are an alkanol group. In some embodiments, X, Y, and Z are all alkanol groups.

With respect to the one or more alkanol groups, the alkyl chain thereof may contain branching. Alternatively, the alkyl chain of the alkanol group may be linear (contains no branching). In preferred embodiments, the alkanol group(s) is based on a linear alkyl chain. Further, the hydroxyl bearing carbon of the alkanol group may be a primary, secondary, or tertiary carbon, preferably the hydroxyl bearing carbon is a secondary carbon.

The alkanolamine (D) may contain a primary amino group (i.e., two of X, Y, and Z are hydrogen), a secondary amino group (i.e., one of X, Y, and Z are hydrogen), or a tertiary amino group (i.e., X, Y, and Z are all non-hydrogen). When an alkanolamine (D) is employed that contains a secondary amino group, the two non-hydrogen substituents may be the same or different alkanol groups, preferably the same alkanol group, for example as is the case in diethanolamine. When an alkanolamine (D) is employed that contains a tertiary amino group, the three non-hydrogen substituents may be the same or different alkanol groups, preferably the same alkanol group, for example as is the case in triethanolamine.

Suitable examples of the alkanolamine (D) include, but are not limited to, ethanolamine, N-methylethanolamine, N,N-dimethylethanolamine, N-ethylethanolamine, N-propylethanolamine, N-isopropylethanolamine, N,N-diisopropylethanolamine, N-butylethanolamine, diethanolamine, N-methyldiethanolamine, N-ethyldiethanolamine, triethanolamine, propanolamine (3-Amino-1-propanol), N-methylpropanolamine, N,N-dimethylpropanolamine, dipropanolamine, tripropanolamine, isopropanolamine, N,N-dimethylisopropanolamine, diisopropanolamine, triisopropanolamine, 2-amino-2-methyl-1-propanol, 2-amino-2-ethyl-1,3-propanediol, 4-amino-1-butanol, 2-amino-1-butanol, sec-butanolamine, and di-sec-butanolamine. In preferred embodiments, the alkanolamine (D) is at least one selected from the group consisting of ethanolamine, diethanolamine, triethanolamine, propanolamine (3-Amino-1-propanol), and isopropanolamine. In more preferred embodiments, the alkanolamine (D) is isopropanolamine.

(E) Silicone Acrylate Copolymer

The inkjet ink may optionally include (E) a silicone acrylate copolymer as a surfactant. The incorporation of such a surfactant may provide the inkjet inks advantageous nozzle discharge properties, as well as leveling and substrate wetting properties, thus contributing to improved overall printed image quality. By use of a copolymer made of distinct materials, such as (meth)acrylate and silicone portions, a single ingredient can supply multiple beneficial characteristics to the inkjet inks. For example, the (meth) acrylate portion may provide advantageous leveling and substrate wetting, while the silicone portion may provide desirable anti-crater properties.

The silicone acrylate copolymers (E) optionally used in the inkjet ink may be obtained according to methods known to those of ordinary skill in the art, for example, by polymerization (e.g., free-radical polymerization) or grafting of a polyorganosiloxane macromer comprising at least one polymerizable group (for example on one of the ends of the chain or on both ends) and a (meth)acrylate monomer, as described for example, in U.S. Pat. No. 5,219,560—incorporated herein by reference in its entirety. Preferably, the silicone acrylate copolymer (E) is a polysiloxane (polyorganosiloxane) modified poly(meth)acrylate, that is, a copolymer composed of a poly(meth)acrylate backbone and a polyorganosiloxane grafted to the acrylic backbone (i.e., a graft copolymer). In preferred embodiments, a major proportion of the silicone acrylate copolymer (E) is poly(meth) acrylate. In preferred embodiments, the silicone acrylate copolymer (E) has a polyorganosiloxane content of at least 1 wt. %, preferably at least 2 wt. %, more preferably at least 3 wt. %, even more preferably at least 4 wt. %, and up to 20 wt. %, preferably up to 15 wt. %, more preferably up to 10 wt. %, even more preferably up to 8 wt. %, based on a total weight of the silicone acrylate copolymer (E).

The polyorganosiloxane macromer may be based on any organosilicon polymer or oligomer of linear structure, of variable molecular weight, which can be formed from polymerization and/or polycondensation of suitably functionalized silanes, and which has a polysiloxane backbone structure (silicon atoms are linked together via oxygen atoms, —Si—O—Si—), with alkyl and/or aryl groups directly bonded to the (tetravalent) silicon atoms. For example, the polyorganosiloxane backbone may be a polydimethylsiloxane backbone where each silicon atom in the backbone is directly bonded to two methyl groups. The polyorganosiloxane macromer which may be used to obtain the silicone acrylate copolymer (E) used herein may contain at least one polymerizable group, preferably located on at least one of the ends of the polysiloxane chain, that is to say that the polyorganosiloxane macromer may have, for example, a polymerizable group on both ends of the polysiloxane chain or may have a polymerizable group on one end of the polysiloxane chain and a non-polymerizable end group (e.g., trimethyl silane, triphenyl silane, phenyldimethylsilane, etc.) on the other end of the chain. In some embodiments, the polymerizable group may be a styrenyl-type group ($CH_2=C(R_1)$ arylene-) or a (meth)acrylate group, in particular a group represented by $CH_2=CR_1—CO—O—R_2—$, wherein $R_1$ is a hydrogen or a methyl group and $R_2$ is a divalent, linear or branched hydrocarbon group having 1 to 10 carbon atoms, preferably 2 to 8 carbon atoms, preferably 3 to 6 carbon atoms, and optionally containing ether bonds therein (e.g., one, two, three, four, etc. ether bonds). In preferred embodiments, $R_2$ is $(CH_2)_n—$ with n=1 to 10, $—CH_2CH(CH_3)CH_2$, $CH_2CH_2OCH_2CH_2CH_2CH_2OCH_2CH_2CH(CH_3)CH_2$, and $—CH_2CH_2OCH_2CH_2OCH_2CH_2CH_2$ The silicone acrylate copolymer (E) may be made using a wide variety of (meth)acrylate monomers, including both (meth)acrylic acid (acrylic acid and methacrylic acid) and ester variants, which may be aryl or alkyl (meth)acrylate esters. The poly(meth)acrylate backbone may be a homopolymer when one type of monomer is employed, or alternatively a copolymer when two or more (meth)acrylate monomers are polymerized. In preferred embodiments, the (meth) acrylate monomers are (meth)acrylate alkyl esters, which may be chosen from linear, branched or cyclic alkyl esters, for example $C_1$ to $C_{22}$ alkyl esters, preferably $C_2$ to $C_{20}$ alkyl esters, preferably $C_3$ to $C_{18}$ alkyl esters of acrylates and methacrylates. In some embodiments, the alkyl group is chosen from methyl, ethyl, butyl, stearyl, isostearyl, and 2-ethyihexyl, as well as mixtures thereof. Suitable (meth) acrylate monomers include, but are not limited to, methyl acrylate, ethyl acrylate, isopropyl acrylate, n-butyl acrylate, tert-butyl acrylate, cyclohexyl acrylate, 2-ethylhexyl acrylate, tridecyl acrylate, stearyl acrylate, isostearyl acrylate, behenyl acrylate, methyl methacrylate, ethyl methacrylate, isopropyl methacrylate, n-butyl methacrylate, tert-butyl methacrylate, cyclohexyl methacrylate, 2-ethylhexyl methacrylate, tridecyl methacrylate, stearyl methacrylate, isostearyl methacrylate, behenyl methacrylate, and combinations thereof.

In some embodiments, the silicone acrylate copolymer (E) has a weight average molecular weight of from 3,000 g/mol, preferably from 4,000 g/mol, more preferably from 5,000 g/mol, even more preferably from 8,000 g/mol, yet even more preferably from 10,000 g/mol, and up to 500,000 g/mol, preferably up to 400,000 g/mol, more preferably up to 300,000 g/mol, even more preferably up to 200,000 g/mol, yet even more preferably up to 100,000 g/mol.

When employed in the inkjet inks, the silicone acrylate copolymer (E) may be used as is or, alternatively, may be dispersed or dissolved in an organic solvent such as lower alcohols containing from 2 to 8 carbon atoms (e.g., ethanol, 1-proponol, 2-propanol, 1-butanol, etc.), ester solvents (e.g., methoxyethyl acetate, ethoxyethyl acetate, methoxypropyl acetate, ethoxypropyl acetate, butyl acetate, etc.) or oils (e.g., cyclopentasiloxane). In some embodiments, when employed as a dispersion or solution, the solvent is an ester solvent, most preferably methoxypropyl acetate. In some embodiments, the solids content of the dispersion or solution is at least 30 wt. %, preferably at least 40 wt. %, preferably at least 50 wt. %, and up to 60 wt. %, preferably up to 55 wt. %, preferably up to 52 wt. %, relative to a total weight of the dispersion/solution.

Representative examples of silicone acrylate copolymers (E) that are commercially available and which may be used in the inkjet inks described herein include, but are not limited to, KP-541, KP-543, KP-545, KP-550, KP-575 (acrylic polymers grafted with polydimethylsiloxane side chains, available from Shin-Etsu Chemical Co., Ltd.), BYK-3550 (available from BYK Japan K.K.), including mixtures thereof. In preferred embodiments, the silicone acrylate copolymer (E) is BYK-3550.

The silicone acrylate copolymer (E) may be employed in amounts of at least 0.01 wt. %, preferably at least 0.05 wt. %, preferably at least 0.1 wt. %, and up to 5 wt. %, preferably up to 4 wt. %, preferably up to 3 wt. %, preferably up to 2.5 wt. %, preferably up to 2 wt. %, preferably up to 1.5 wt. %, preferably up to 1 wt. %, preferably up to 0.5 wt. %, based on a total weight of the inkjet ink.

(F) Colorant

It is to be readily appreciated by those of ordinary skill in the art that colorants may be optionally included in the inkjet inks to provide colored inks that may be used for a variety of printing purposes and the inkjet inks are not limited to any particular color. Any colorant can be employed in the inkjet inks to provide the desired color, including dyes, pigments, mixtures thereof, and the like, provided that the colorant can be dissolved or dispersed within the inkjet inks. Suitable colors include, for example, cyan, magenta, yellow, and key (black) ("CMYK"), white, orange, green, light cyan, light magenta, violet, and the like, including both spot colors and process colors. In general, the colorants may be employed in amounts of at least 0.1 wt. %, preferably at least 0.5 wt. %, preferably at least 1 wt. %, preferably at least 2 wt. %, preferably at least 3 wt. %, and up to 20 wt. %, preferably up to 15 wt. %, preferably up to 10 wt. %, preferably up to 8 wt. %, preferably up to 7 wt. %, relative to the total weight of the inkjet inks.

Dye

The inkjet inks can be formulated with various dyes, with particular preference given to metal complex dyes.

Pigment

The inkjet inks can be formulated with various inorganic pigments and/or organic pigments. In addition to providing color to the inkjet inks, such pigments may be capable of improving the light resistance, the weather resistance, etc., of the printed images.

(G) Additives

In addition to the components already mentioned, the inkjet inks may also be formulated with various additives (G) to improve various ink characteristics and performance. For example, the inkjet inks may optionally contain one or more of an anti-kogation agent, a surfactant, a stabilizer, and a security taggant.

Methods of Making

Embodiments of the inkjet inks described herein may be prepared by any suitable technique known to those of ordinary skill in the art, for example by combining components (A) a terpene phenol resin, (B) ethanol, and (C) 1-propanol, and any desired optional ingredients (e.g., (D) an alkanolamine, (E) a silicone acrylate copolymer, (F) a colorant, and/or an additive (G)), in any order and stirring, agitating, and/or homogenizing at a temperature between 20 and 100° C. until a homogeneous solution is formed.

In one example, the inkjet ink may be made by first combining the solvents (e.g., ethanol (B) and 1-propanol (C)) with an alkanolamine (D) in a vessel, followed by the addition of any polymeric ingredient (e.g., the terpene phenol resin (A) and the silicone acrylate copolymer ((E)) and any desired additive (G) and mixing until a homogeneous solution is formed. The colorant (F) may then be added as the final component with continued mixing, and the solution may then be mixed for at least 30 minutes to afford the inkjet ink. The resulting inkjet ink may then be placed into a printing cartridge, such as HP45SI made by Hewlett Packard.

Properties

Among other advantages, the inkjet inks disclosed herein provide a superior combination of quick dry times after being applied onto a substrate and high optical density prints.

Dry times may be measured by applying the inkjet inks in the form of a solid block image (e.g., 1 cm*10 cm) onto a substrate, waiting for the inkjet inks to dry under ambient conditions (in air at room temperature, about 23° C., without applied heat), for a certain period of time, for example at 5, 10, 15, 20, 25, or 30 seconds, and then performing an abrasion test by finger to test if color transfers from the printed image to the finger at the tested time interval. If color transfer occurs, then the tested dry time is not satisfactory to achieve complete drying (rated "No Good", NG). If color transfer does not occur, then the tested dry time is satisfactory to achieve complete drying (rated "Good", G). Any inkjet inks requiring dry times of over 30 seconds to achieve a "Good" rating are considered unacceptable (slow drying), while those which achieve a "Good" rating with dry times of 30 seconds or less are deemed acceptable (or quick drying). In preferred embodiments, the inkjet inks of the present disclosure have acceptable (quick) dry times, and dry within 30 seconds or less, preferably 25 seconds or less, more preferably 20 seconds or less, even more preferably 15 seconds or less after being applied.

Optical density may be measured by printing a solid block image (e.g., 1 cm*10 cm) and taking optical density readings with a spectrophotometer (e.g., X-rite eXact, Density/TVI mode, sold by X-rite). As optical density is the measure of reflected or absorbed light being pulled into the printed surface, optical density values are dimensionless. Inkjet inks that provide optical density readouts of under 1.90 are considered "No Good" (NG) or low optical density, whereas those that provide optical density readouts of 1.90 or higher are deemed "Good" (G) or high optical density. In preferred embodiments, the inkjet inks of the present disclosure provide printed images having "Good" optical densities of at least 1.90, preferably at least 1.91, preferably at least 1.92, preferably at least 1.94, preferably at least 1.96, preferably at least 1.98, preferably at least 2.00, preferably at least 2.05, preferably at least 2.10, preferably at least 2.15, preferably at least 2.17, and preferably up to 2.30, or preferably up to 2.20.

In some embodiments, the inkjet inks have a pH of 5.5 or greater, preferably 5.7 or greater, preferably 6.0 or greater, preferably 6.5 or greater, preferably 7.0 or greater, and up to 8.8, preferably up to 8.7, preferably up to 8.6, preferably up to 8.5, preferably up to 8.4, preferably up to 8.3.

Printed Article

The inkjet inks can be printed on various substrates including three dimensional parts as well as flat sheets or webs that are supplied in roll form, for the manufacture of a wide variety of printed articles. Additionally, the substrates may possess various surface types, for example, a flat surface, a structured surface, such as grained surfaces, and a three-dimensional surface, such as curved and/or complex surfaces. Such printed articles may be suitable in the graphic arts, textiles, packaging, lottery, business forms and publishing industries, examples of which include a tag or label, a lottery ticket, a publication, packaging (e.g., flexible packaging), a folding carton, a rigid container (e.g., a plastic cup or tub, glass containers, metal cans, bottles, jars, and tubes), a point-of-sale display, and the like.

The inkjet inks may be printed on porous or penetrable substrates, examples of which include, but are not limited to, non-coated paper, wood, membranes, and fabrics (including, for example, but not limited to, woven fabric, non-woven fabric, and foil-laminated fabric).

The inkjet inks may also be printed on non-porous or non-penetrable substrates, for example, various plastics, glass, metals, and/or non-penetration papers (e.g., coated papers). These may include, but are not limited to, molded plastic parts as well a flat sheets or rolls of plastic films. Examples include those containing polyesters such as polyethylene terephthalate (PET), biaxially oriented polystyrene (OPS), polyolefins such as polyethylene (PE), polypropylene (PP), and oriented polypropylene (OPP), polylactic acid (PLA), oriented nylon, polyvinyl chloride (PVC), cellulose triacetate (TAC), polycarbonate, acrylonitrile butadiene styrene (ABS), polyacetal and polyvinyl alcohol (PVA), and the like. In preferred embodiments, the substrate is a PET film, one example of which is U292W made by Teijin.

Method of Forming a Printed Image

With inkjet printing, a desired printed image is formed when a precise pattern of dots is ejected from a drop-generating device, known as a printhead, onto a print medium. The printhead has an array of precisely formed nozzles located on a nozzle plate and attached to an inkjet printhead substrate. The inkjet printhead substrate incorporates an array of firing chambers that receive inkjet ink through fluid communication with one or more ink reservoirs. Each firing chamber has a resistor element, known as a firing resistor, located opposite the nozzle so that the inkjet ink collects between the firing resistor and the nozzle. Each resistor element is typically a pad of a resistive material and measures for example about 35 μm×35 μm. The printhead is held and protected by an outer packaging referred to as a print cartridge or an inkjet pen. Upon energizing of a particular resistor element, a droplet of inkjet ink is expelled through the nozzle toward the print medium. The firing of ink droplets is typically under the control of a microprocessor, the signals of which are conveyed by electrical traces to the resistor elements, forming alphanumeric and other image patterns on the print medium. Since the nozzles are small, typically 10 μm to 40 μm in diameter, inks that minimize clogging are desired.

The present disclosure provides a method of forming a printed image by applying the inkjet ink, in one or more of its embodiments, onto a surface of a substrate by a thermal inkjet printhead and allowing the inkjet ink to dry. Use of the inkjet inks described herein overcomes the slow dry time and low optical density print problems commonly associated with thermal inkjet processes.

Any drop on demand printhead known to those of ordinary skill in the art of inkjet printing can be used as printing units in the present method, including continuous printheads, thermal printheads, electrostatic printheads, and acoustic printheads, preferably a thermal printhead (having a thermal transducer) is used. Typical parameters, such as, for example, printing resolution, printing speed, printhead pulse warming temperature, driving voltage and pulse length, can be adjusted according to the specifications of the printhead. Printheads which are generally suitable for usage in the methods herein have a droplet size in the range of 2 to 80 μL and a droplet frequency in the range of 10 to 100 kHz, and high quality prints may be obtained for example by setting the driving voltage to 8.0 to 9.0 Volts, the print speed up to 300 feet/minute, the pulse warming temperature to 35 to 45° C., and the pulse length to 1.0-2.5 microseconds, although values above or below these described may also be used and still obtain satisfactory prints. One non-limiting printhead example suitable for use in the disclosed methods is HP45SI made by Hewlett Packard.

After application, the inkjet ink is dried. In preferred embodiments, drying is achieved by allowing the applied inkjet ink to dry under ambient conditions (in air, at about 23° C.) for 30 seconds or less, preferably 25 seconds or less, more preferably 20 seconds or less, even more preferably 15 seconds or less.

In preferred embodiments, external heat is not applied to facilitate drying or to increase drying speeds. For example, a heater is preferably not employed for drying the inkjet ink after application. Furthermore, the methods of the present disclosure do not require UV or electron beam curing. Once the applied ink is deemed dry, further coatings of inkjet ink may be applied, or any processing steps known to those of ordinary skill in the art may be performed as desired.

It should also be recognized that substrate surface treatments such as corona treatment, atmospheric plasma treatment, and flame treatment may optionally be employed in the methods herein prior to application of the inkjet inks to improve printed article characteristics, for example ink adhesion. The parameters of such substrate surface treatments may be varied greatly depending on the substrate material to be printed, the specific inkjet ink utilized, the printing method applied, and the desired properties and applications of the printed article.

The examples below are intended to further illustrate the inkjet inks and are not intended to limit the scope of the claims.

EXAMPLES

Inkjet Inks

Several example inkjet inks are given in Table 1 below. The amount of each component is expressed in terms of weight percentage relative to a total weight of 100%. Hydroxyl values (OHV) were determined according to JIS K 0070: 1992. RM=raw material. BYK-3550 is a silicone acrylate copolymer available from BYK. U130 POLYSTER, U115 POLYSTER, T145 POLYSTER, G125 POLYSTER, N125 POLYSTER, and K125 POLYSTER are terpene phenol resins available from Yasuhara Chemical. DERTOPHENE T is a terpene phenol resin available from Pinova. VALIFAST Black 3870 is a black azo-metal complex dye available from Orient Chemical Industries.

In the tables below, * denotes the example is a comparative example.

TABLE 1

| | | Ink | | | | | | | |
|---|---|---|---|---|---|---|---|---|---|
| | RM | 1 | 2 | 3 | 4 | 5 | 6 | 7* | 8* |
| Ethanol | A169 | 68.50 | 58.50 | 48.50 | 28.50 | 69.00 | 70.00 | | 88.50 |
| 1-Propanol | A168 | 20.00 | 30.00 | 40.00 | 60.00 | 20.00 | 20.00 | 88.50 | |
| Acetone | A105 | | | | | | | | |
| 2-Propanol | A120 | | | | | | | | |
| Isopropanolamine | N/A | 0.50 | 0.50 | 0.50 | 0.50 | | 0.50 | 0.50 | 0.50 |
| BYK-3550 | N/A | 1.50 | 1.50 | 1.50 | 1.50 | 1.50 | | 1.50 | 1.50 |
| U130 POLYSTER (OHV = 25) | N/A | | | | | | | | |
| U115 POLYSTER (OHV = 30) | N/A | | | | | | | | |
| DERTOPHENE T (OHV = 40) | N/A | | | | | | | | |
| T145 POLYSTER (OHV = 65) | N/A | 2.50 | 2.50 | 2.50 | 2.50 | 2.50 | 2.50 | 2.50 | 2.50 |
| G125 POLYSTER (OHV = 135) | N/A | | | | | | | | |
| N125 POLYSTER (OHV = 165) | N/A | | | | | | | | |

TABLE 1-continued

| | | | | | | | | |
|---|---|---|---|---|---|---|---|---|
| K125 POLYESTER (OHV = 205) | N/A | | | | | | | |
| VALIFAST Black 3870 | H135 | 7.00 | 7.00 | 7.00 | 7.00 | 7.00 | 7.00 | 7.00 | 7.00 |
| Total | | 100.00 | 100.00 | 100.00 | 100.00 | 100.00 | 100.00 | 100.00 | 100.00 |

| | | Ink | | | | | | | |
|---|---|---|---|---|---|---|---|---|---|
| | RM | 9* | 10* | 11* | 12 | 13* | 14* | 15* | 16* |
| Ethanol | A169 | 68.50 | 68.50 | 68.50 | 68.50 | 68.50 | 68.50 | 68.50 | 68.50 |
| 1-Propanol | A168 | 20.00 | 20.00 | 20.00 | 20.00 | 20.00 | 20.00 | | |
| Acetone | A105 | | | | | | | 20.00 | |
| 2-Propanol | A120 | | | | | | | | 20.00 |
| Isopropanolamine | N/A | 0.50 | 0.50 | 0.50 | 0.50 | 0.50 | 0.50 | 0.50 | 0.50 |
| BYK-3550 | N/A | 1.50 | 1.50 | 1.50 | 1.50 | 1.50 | 1.50 | 1.50 | 1.50 |
| U130 POLYESTER (OHV = 25) | N/A | 2.50 | | | | | | | |
| U115 POLYESTER (OHV = 30) | N/A | | 2.50 | | | | | | |
| DERTOPHENE T (OHV = 40) | N/A | | | 2.50 | | | | | |
| T145 POLYESTER (OHV = 65) | N/A | | | | | | | 2.50 | 2.50 |
| G125 POLYESTER (OHV = 135) | N/A | | | | 2.50 | | | | |
| N125 POLYESTER (OHV = 165) | N/A | | | | | 2.50 | | | |
| K125 POLYESTER (OHV = 205) | N/A | | | | | | 2.50 | | |
| VALIFAST Black 3870 | H135 | 7.00 | 7.00 | 7.00 | 7.00 | 7.00 | 7.00 | 7.00 | 7.00 |
| Total | | 100.00 | 100.00 | 100.00 | 100.00 | 100.00 | 100.00 | 100.00 | 100.00 |

Preparation Methods

Firstly the solvents and any amines were added into a 200 mL beaker. Secondly the polymers were added into the solution and mixed using magnetic stirrer until the polymers were dissolved. Finally, the colorant (e.g., dye) was added into the solution and mixed for at least 30 min. The obtained ink was filled into a HP45SI cartridge made by Hewlett Packard.

Inkjet Ink Evaluation Methods
Printing Sample Preparation

Thermal printing technology related to Hewlett Packard was used to evaluate the inks (Software and hardware made by Inc.jet, Transport table made by Kirk Rudy). A white PET film was used for the printing substrate (U292W made by TWIN). The printing conditions utilized were as follows:
  Printing resolution; 600 dpi*300 dpi (vertical*horizontal)
  Printing speed; 100 feet/minute
  Driving voltage; 8.4 V
  Pulse length; 1.80 µs
  Pulse warming temperature; 40° C.
  Printing image; 100% duty (1 cm*10 cm, Monochrome bitmap)

Dry Time Measurements

The abrasion test was done by the finger after specific time passed (5, 10, 15, 20, 25, and 30 sec). A colored finger indicates not enough time has lapsed for complete drying (NG, No good), and a non-colored finger indicates the time is adequate for complete drying (G, Good). A drying time of over 30 seconds is deemed unacceptable (slow drying) and a dry time of 30 seconds or under is deemed acceptable (quick drying).

Optical Density Measurements

A spectrophotometer was used to measure the optical density (X-rite eXact, Density/TVI mode, made by X-rite; a blank substrate was used for baseline). An optical density under 1.90 is considered NG (No good) and over 1.90 is considered G (Good).

pH Measurements

The pH values of the inks were measured at 25° C. using a bench-top pH meter "SB20" available from SympHony (Table 2).

Inkjet Ink Properties and Performance

TABLE 2

Inkjet Ink pH

| Ink | 1 | 2 | 3 | 4 | 5 | 6 | 7* | 8* | 9* | 10* | 11* | 12 | 13* | 14* | 15* | 16* |
|---|---|---|---|---|---|---|---|---|---|---|---|---|---|---|---|---|
| pH | 8.60 | 8.63 | 8.61 | 8.65 | 5.70 | 8.55 | 8.59 | 8.36 | 8.61 | 8.55 | 8.53 | 8.36 | 8.42 | 8.47 | 7.26 | 8.45 |

TABLE 3

Inkjet Ink Dry Time and Optical Density

| | | Ink | | | | | | | | | | | | | | | |
|---|---|---|---|---|---|---|---|---|---|---|---|---|---|---|---|---|---|
| Printer condition | | 1 | 2 | 3 | 4 | 5 | 6 | 7* | 8* | 9* | 10* | 11* | 12 | 13* | 14* | 15* | 16* |
| | | Old printing table, 40° C., 600*300 dpi, 100 m/min | | | | | | | | | | | | | | | |
| *1Dry time (sec) 600*300 dpi, 100% duty Non penetration substrate | 5 | NG | NG | NG | NG | NG | NG | NG | NG | NG | NG | NG | NG | NG | NG | NG | NG |
| | 10 | NG | NG | NG | NG | NG | NG | NG | NG | NG | NG | NG | NG | NG | NG | NG | NG |
| | 15 | NG | NG | NG | NG | NG | NG | NG | NG | NG | NG | NG | G | NG | NG | NG | NG |
| | 20 | NG | NG | G | G | NG | NG | G | NG | NG | NG | NG | G | NG | G | NG | NG |
| | 25 | G | G | G | G | G | G | G | G | NG | NG | NG | G | G | G | NG | NG |
| | 30 | G | G | G | G | G | G | G | G | G | G | G | G | G | G | NG | G |
| *2OD 600*300 dpi | ≥1.90 | 2.13 | 2.15 | 2.17 | 1.98 | 1.91 | 1.92 | 1.85 | 1.45 | 1.56 | 1.73 | 1.83 | 1.95 | 1.67 | 1.75 | 2.16 | 1.75 |

*1G (Good) shows there is no color transferred in touching the printing surface. Otherwise, NG (No Good).
*2OD is optical density: G (Good) is 1.90 or higher than 1.90. Less than 1.90 is NG (No Good).

Solvent System Effects

As shown in Table 3, the use of ethanol and 1-propanol produced "Good" dry times and "Good" optical density prints (Examples 1-6 and 12). On the other hand, the use of only one of ethanol or 1-propanol (Comparative Example 7 and 8) produced poor optical density prints (No Good). Further, replacing 1-propanol with acetone (Comparative Example 15) produced "Good" optical density prints, but slow dry times (NG, >30 seconds), while replacing 1-propanol with 2-propanol (Comparative Example 16) produced poor optical density prints (No Good).

Hydroxyl Value Effects

As shown in Table 3, the use of terpene phenol resins having hydroxyl values of 65 mgKOH/g and 135 mgKOH/g produced "Good" dry times and "Good" optical density prints (Examples 1-6 and 12), while use of terpene phenol resins having lower hydroxyl values of 25 mgKOH/g, 30 mgKOH/g, and 40 mgKOH/g (Comparative Examples 9-11, respectively) or higher hydroxyl values of 165 mgKOH/g and 205 mgKOH/g (Comparative Examples 13 and 14, respectively), produced poor optical density prints (No Good).

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. An inkjet ink, comprising:
    (A) a terpene phenol resin having a hydroxyl value of 50 to 150 mgKOH/g;
    (B) ethanol; and
    (C) 1-propanol,
    wherein a combined weight of ethanol (B) and 1-propanol (C) ((B)+(C)) in the inkjet ink is 88.5 to 95 wt. %, based on a total weight of the inkjet ink.

2. The inkjet ink of claim 1, wherein the terpene phenol resin (A) is a copolymer formed from a reaction between a monoterpene and a phenolic compound comprising at least one hydroxyl group and at least two replaceable hydrogen atoms in ortho- and/or para-positions with respect to the at least one hydroxyl group.

3. The inkjet ink of claim 2, wherein the monoterpene is at least one bicyclic monoterpene selected from the group consisting of 3-carene, α-pinene, β-pinene, and camphene.

4. The inkjet ink of claim 2, wherein the phenolic compound is phenol.

5. The inkjet ink of claim 1, wherein the terpene phenol resin (A) has a hydroxyl value of 65 to 135 mgKOH/g.

6. The inkjet ink of claim 1, wherein the terpene phenol resin (A) is present in an amount of 0.1 to 10 wt. %, based on a total weight of the inkjet ink.

7. The inkjet ink of claim 1, wherein a weight ratio of 1-propanol (C) to ethanol (B) ((C):(B)) is 0.1:1 to 3.5:1.

8. The inkjet ink of claim 1, further comprising (D) an alkanolamine.

9. The inkjet ink of claim 8, wherein the alkanolamine (D) comprises 2 to 8 carbon atoms.

10. The inkjet ink of claim 8, wherein the alkanolamine (D) is isopropanolamine.

11. The inkjet ink of claim 8, wherein the alkanolamine (D) is present in an amount of up to 3 wt. %, based on a total weight of the inkjet ink.

12. The inkjet ink of claim 1, further comprising (E) a silicone acrylate copolymer.

13. The inkjet ink of claim 12, wherein the silicone acrylate copolymer (E) is a graft copolymer.

14. The inkjet ink of claim 12, wherein the silicone acrylate copolymer (E) is present in an amount of up to 5 wt. %, based on a total weight of the inkjet ink.

15. The inkjet ink of claim 1, further comprising (F) a colorant.

16. The inkjet ink of claim 1, which is substantially free of a ketone solvent.

17. The inkjet ink of claim 1, which is substantially free of 2-propanol.

18. A method of forming a printed image on a substrate, comprising:
 applying the inkjet ink of claim 1 onto the substrate with a thermal inkjet printhead; and
 drying the inkjet ink.

19. The method of claim 18, wherein a heater is not employed for drying the inkjet ink.

* * * * *